Patented June 7, 1932

1,862,000

UNITED STATES PATENT OFFICE

EDGAR C. BRITTON AND SHAILER L. BASS, OF MIDLAND, MICHIGAN, ASSIGNORS TO THE DOW CHEMICAL COMPANY, OF MIDLAND, MICHIGAN, A CORPORATION OF MICHIGAN

PREPARATION OF PARA-PHENYLPHENOL

No Drawing.  Application filed July 16, 1930.  Serial No. 468,448.

The present invention concerns methods for the preparation of phenylphenols, particularly for the preparation thereof by the dehydrogenation of cyclohexylphenols, and more particularly for the preparation of para-phenylphenol by the catalytic dehydrogenation of para-cyclohexylphenol.

We have found that para-cyclohexylphenol can be converted smoothly and substantially completely into para-phenylphenol and hydrogen by heating the former compound in the presence of a suitable dehydrogenation catalyst such as palladium, platinum or nickel, or a combination or equivalent thereof. Accordingly, our invention consists of the method hereinafter fully described and particularly pointed out in the claims, the following description setting forth but several of the various ways in which the principle of our invention may be used.

In carrying out our invention, we have found that para-cyclohexylphenol can be dehydrogenated either in liquid or vapor phase, or combination thereof, by operating with a catalyst of the abovementioned type. The dehydrogenation may be carried out at atmospheric pressure, or under reduced or increased pressures, and advisedly in a non-oxidizing atmosphere, such as hydrogen or nitrogen. For instance, para-cyclohexylphenol may be heated at a temperature above about 185° C., in a solvent such as phenol, xylene, cymene, or diphenyl oxide in the presence of a suitable dehydrogenating catalyst, and in an atmosphere of a gas such as hydrogen or nitrogen, which is substantially unreactive with the reaction components under the used conditions, whereby para-phenylphenol and hydrogen are produced. Another way of carrying out our invention is to heat the cyclohexylphenol in the absence of a solvent at a temperature between about 250–350° C. with a suitable catalyst, and preferably with agitation of the reaction components.

In carrying out our invention, we use a dehydrogenation catalyst comprising, e. g. palladium, platinum, or nickel, such catalyst preferably being supported on a suitable material. Palladium may be used on a support which is substantially unreactive in the dehydrogenation reaction to be carried out, e. g. barium sulfate, or a siliceous material such as "Filtercel". Nickel, which tends to decompose para-cyclohexylphenol into by-products such as diphenyl, methane, hydrogen, and water, when employed alone or on an inert support of the above type, is preferably employed on a support such as alumina, active carbon, or active silica, which modifies the action of the nickel. When used on active silica, nickel acts primarily as a dehydrogenation catalyst, the formation of undesirable by-products being negligible. For instance, we have obtained para-phenylphenol in very high yields by employing palladium deposited on barium sulfate, or nickel on hydrated aluminum oxide as catalyst. When palladium on barium sulfate is used, dehydrogenation of the cyclohexyl ring in para-cyclohexylphenol, begins at about 185° C., becomes quite pronounced at about 200° C., rapid at about 250° C., and very rapid at approximately 300° C. We have found the most suitable operating temperature to be between about 275° and 325° C.

Para-phenylphenol may be recovered from the crude product in any suitable way. For instance, the reaction mixture may be filtered free from catalyst, if present, or it may be dissolved in a suitable solvent such as carbon tetrachloride, chlorobenzene, or benzene previous to separating the catalyst therefrom, and fractionally distilled. Or, the solution of the reaction mixture may be concentrated and the product crystallized therefrom. Still another way of recovering the product from the reaction mixture, particularly when the catalyst is not admixed therewith, is to fractionally distill the same.

The following examples illustrate several ways of operating the above described dehydrogenation reaction.

Example 1

23.5 grams of Filtercel was suspended in 400 cc. water and a solution of 2 grams of palladium chloride in 50 cc. water containing 5 cc. concentrated hydrochloric acid and a few drops of nitric acid, added thereto. The suspension was well shaken, 2 cc. of 40 per cent formalin added thereto, stirred and cooled to about 10° C., made alkaline with 10 per cent aqueous sodium hydroxide solution, and rapidly heated to boiling. The reduction of the palladium salt to metallic palladium which started at about 50° C., was practically complete at 60° C. The suspension was then rapidly cooled to room temperature, washed with water and dried in a slow stream of hydrogen at about 200° C.

35 grams para-cyclohexylphenol was refluxed 1½ hours with 12 grams of the above palladinized-Filtercel catalyst, which included 0.6 gram palladium, at the boiling point thereof, i. e. about 300° C., and in an apparatus in which the air had previously been replaced by hydrogen, the system being maintained at between atmospheric pressure and about 100 millimeters below atmospheric pressure. The gas liberated during the dehydrogenation was practically pure hydrogen and contained no traces of methane or other hydrocarbons whose presence would indicate decomposition.

The product was recovered from the reaction mixture by dissolving the latter in 500 cubic centimeters of hot 10 per cent sodium hydroxide solution, and filtering the solution while hot to remove catalyst therefrom. The filtrate was cooled, acidified with hydrochloric acid, and the precipitated paraphenylphenol then separated from the residual liquid by filtration and dried. The yield of crude product, melting at 160° to 162° C., was 93 per cent, based on the amount of starting material used, or a practically quantitative yield based on the amount of starting material reacted. On recrystallization of the crude product from carbon tetrachloride the melting point thereof was raised to 168.5° to 169° C. The palladium-containing catalyst may be reactivated by burning off the organic matter in a current of air.

*Example 2*

70 grams of nickel together with 6 grams aluminum were precipitated as the hydroxides thereof upon 25 grams of activated aluminum hydroxide. The mixed nickel-aluminum hydroxides were then heated to about 300° to 350° C. in a stream of hydrogen.

35 grams para-cyclohexylphenol was dehydrogenated as described in the above example excepting that 5 grams of the nickel-alumina catalyst, containing about 2.5 grams nickel, was used. Para-phenylphenol was obtained in an almost quantitative yield, the same being recovered from the crude reaction mixture as per Example 1.

*Example 3*

35 grams para-cyclohexylphenol was refluxed for 1½ hours, the vapors contacting with palladium-black which had been deposited electrolytically on a roll of palladium gauze, the latter gauze being in the reflux-tube and maintained at a temperature of 275-300° C. Previous to the refluxing, the air in the system had been replaced by hydrogen, the system thereafter being maintained during the heating period at a pressure of 50-60 mm. below atmospheric. The reaction mixture then was crystallized from carbon tetrachloride, obtaining thereby paraphenylphenol of excellent purity in 95.5 per cent yield.

The palladium gauze may be reactivated for instance by re-depositing a small amount of palladium-black thereupon, or by burning off the organic matter in a current of air. If desired, palladium may be deposited on a wire-gauze of other metal, e. g. copper, iron, nichrome, etc.

The herein described dehydrogenation method may be conducted in other ways, such as by passing a stream of the liquid cyclohexyl compound through a body of a supported catalyst maintained in a heating zone, the rate of flow preferably being so adjusted that one passage of the liquid therethrough is sufficient to obtain substantially complete conversion of the starting material into the desired product. Or, the cyclohexyl compound in liquid state may be heated at the desired temperature during the dehydrogenation, the catalyst being contained within a fine copper screen submerged in the heated liquid.

Other cyclohexyl compounds which are equivalent thereto under the conditions mentioned in our invention, such as the alkylated cyclohexylphenols, e. g. methyl-cyclohexylphenol, cyclohexylcresol, or di-(p)-cyclohexylphenyl ether, may be dehydrogenated in a similar manner.

Briefly our invention which specifically consists in the catalytic dehydrogenation of para-cyclohexylphenol into para-phenylphenol and hydrogen, in either the vapor or liquid phase, at a temperature of between about 185° to 350° C., and in the presence of a dehydrogenation catalyst such as palladium or nickel, said catalyst being carried on a support or not as desired, also comprises the dehydrogenation under similar conditions of other cyclohexyl compounds which are equivalent to para-cyclohexylphenol under the conditions described above.

Although our invention can be carried out in any of the hereindescribed ways, particularly as illustrated by the examples, we prefer to operate our new dehydrogenation method in the manner shown specifically in the third example, i. e. the dehydrogenation of the cyclohexylphenol compound is preferably carried out in the vapor phase.

Other modes of applying the principle of our invention may be employed instead of those explained, change being made as regards the steps herein disclosed, provided the details stated by any of the following claims or the equivalent thereof be employed.

We therefore particularly point out and distinctly claim as our invention:—

1. The method of making para-phenylphenol and homologues thereof which comprises heating the corresponding para-cyclohexylphenol at a temperature between 185° and 350° C. in the presence of a metallic dehydrogenation catalyst, whereby hydrogen is eliminated from the cyclohexyl group.

2. The method of making para-phenylphenol and homologues thereof which comprises heating the corresponding cyclohexylphenol, in the vapor phase, at a temperature between 185° and 350° C. and in the presence of a metallic dehydrogenation catalyst, whereby hydrogen is eliminated from the cyclohexyl group.

3. The method of making para-phenylphenol and homologues thereof which comprises heating the corresponding cyclohexylphenol at a temperature between 185° and 350° C. in the presence of a dehydrogenation catalyst including palladium, whereby hydrogen is eliminated from the cyclohexyl group.

4. The method of making para-phenylphenol which comprises heating para-cyclohexylphenol at a temperature between about 185° and about 350° C. in the presence of a metallic dehydrogenation catalyst, whereby hydrogen is eliminated from the cyclohexyl group.

5. The method of making para-phenylphenol which comprises heating para-cyclohexylphenol in the vapor phase at a temperature between 185° C. and 350° C. and in the presence of a metallic dehydrogenation catalyst, whereby hydrogen is eliminated from the cyclohexyl group.

6. The method of making para-phenylphenol which comprises heating para-cyclohexylphenol at a temperature between about 185° and about 350° C. in the presence of a dehydrogenation catalyst including palladium, whereby hydrogen is eliminated from the cyclohexyl group.

7. The method of making para-phenylphenol which comprises heating para-cyclohexylphenol at a temperature between about 185° and about 350° C. in the presence of palladium, whereby hydrogen is eliminated from the cyclohexyl group.

8. The method of making para-phenylphenol which comprises heating para-cyclohexylphenol at a temperature between about 185° and about 350° C. in the presence of a dehydrogenation cataylst including palladium, in a non-oxidizing atmosphere, whereby hydrogen is split off from the cyclohexyl ring.

9. The method of making para-phenylphenol which comprises heating para-cyclohexylphenol at a temperature between about 185° and about 350° C. in the presence of a dehydrogenation catalyst including palladium, in a hydrogen atmosphere, whereby the cyclohexyl ring is dehydrogenated.

10. The method of making para-phenylphenol which comprises heating para-cyclohexylphenol in the vapor phase at a temperature of about 275–300° C. in the presence of a dehydrogenation catalyst including palladium and under a pressure maintained between atmospheric pressure and about 100 millimeters sub-atmospheric pressure, whereby the cyclohexyl ring loses hydrogen therefrom.

11. The method of making para-phenylphenol which comprises refluxing para-cyclohexylphenol, contacting the vapors of the latter with a palladium-black catalyst at a temperature between 185° and 350° C. and in a non-oxidizing atmosphere, whereby dehydrogenation of the cyclohexyl compound occurs, and recovering para-phenylphenol from the crude reaction product.

Signed by us this 11 day of July, 1930.

EDGAR C. BRITTON.
SHAILER L. BASS.